United States Patent Office 2,917,463
Patented Dec. 15, 1959

2,917,463

METHOD OF PREPARING ACTIVATED CALCIUM HALOPHOSPHATE PHOSPHOR

David F. Fortney, Towanda, Pa., assignor, by mesne assignments, to Sylvania Electric Products Inc., Wilmington, Del., a corporation of Delaware No Drawing. Application February 3, 1954
Serial No. 408,030

7 Claims. (Cl. 252—301.4)

This invention relates to the preparation of activated calcium halophosphate phosphors.

The phosphor has previously been made by precipitating so-called tri-calcium phosphate from a solution of calcium carbonate by adding phosphoric acid, then mixing the dried precipitate with other dry ingredients and firing to form the phosphor. It is difficult to fix the proportions of calcium and phosphorous by this method, because the precipitate is not actually tri-calcium phosphate; it is a mixture of that and secondary calcium phosphate. Since the preparations are critical, this varies the luminescence of the phosphor from batch to batch.

The phosphor has also been prepared by using secondary calcium phosphate rather than tri-calcium phosphate as the source of phosphorous, because the secondary calcium phosphate can be produced with greater uniformity. The secondary phosphate was then mixed with the other necessary ingredients, and all fired together as dry powders to form the phosphor.

We have found, however, that a smaller particle size and increased brightness can be obtained if the materials are formed in suspension. For example, we suspend calcium carbonate in water, then add phosphoric acid in equal molecular proportions to precipitate secondary calcium phosphate. Additional calcium carbonate and sources of fluoride and activator compounds can then be added to the suspension, to which after filtering and drying, some ammonium chloride is added and the resultant dry, powdered mixture fired to form the phosphor.

The efficiency of the phosphor is increased 2 L.P.W. and the phosphor made more reproducible by thus adding at first only enough calcium carbonate to form the secondary phosphate, then adding the remainder.

In one embodiment of the invention, we place 5 liters of water in a 14-liter Pyrex jar. Calcium carbonate is then added to the suspension, while stirring, and the phosphoric acid is then added. The proportions used are as follows:

| Material | Moles | Grams |
| --- | --- | --- |
| $CaCO_3$ | 9.0 | 900 |
| $H_3PO_4$ | 9.0 | 1026 |

The phosphoric acid used contained 86% acid, the rest being water.

The solution is then stirred for about fifteen minutes, then the following materials are added to the suspension:

| Material | Moles | Grams |
| --- | --- | --- |
| $CaCO_3$ | 3.96 | 396 |
| $CaF_2$ | 1.20 | 93 |
| $MnCO_3$ | 0.24 | 27.6 |
| $Sb_2O_3$ | 0.18 | 52.5 |

The suspension is then stirred for about thirty minutes and filtered. The resultant cake of powder is placed in a tray and dried in an oven. About 0.90 mole (48 grams) of ammonium chloride ($NH_4Cl$) is then added to the dry powder and blended and hammermilled to form an intimate mixture, and then fired for 6 hours at about 1130° C.

The additional calcium carbonate can be added in the form of calcium oxide or other compounds reducible to the oxide on firing and the manganese and antimony compounds can be the oxides or compounds reducible to the oxides on firing.

In a test in which the new phosphor made as above was used as a coating for 40-watt fluorescent lamps, and compared with a coated lamp of the same type but coated with a phosphor in which all the components were mixed dry, the following results were obtained:

| Phosphor | Particle Size, Microns | L.P.W. 300 Hours |
| --- | --- | --- |
| Control | 8.8 | 61.8 |
| New Phosphor | 6.8 | 64.2 |

Although the amount of phosphoric acid added to the calcium carbonate suspension at the beginning of the process should be substantially equal to the amount of calcium carbonate present in moles, the amount of calcium carbonate added after the precipitation can be varied somewhat, to give a desired gram-atom ratio of calcium to phosphorous which is preferably between 4.70/3.00 and 4.95/3.00. The amount of fluoride and chloride present per mole of phosphoric acid and the amount of manganese-containing and antimony-containing compounds, can also be varied to give a desired phosphor color and brightness, as is known in the art. In some cases, it may be desired to omit the manganese altogether, in which case the phosphor fluorescence will be blue. The chloride can also be omitted, and only the fluoride used.

In general, the preferable proportions of manganese, antimony, fluorine and chlorine, will be as follows for three moles of phosphoric acid:

|  | Gram-atoms |
| --- | --- |
| F plus Cl | 0.9 to 1.2 |
| Cl | 0.0 to 1.2 |
| Sb | 0.01 to 0.18 |
| Mn | 0.0 to 0.3 |

The preferred range of firing temperatures is between about 1040° C. and 1180° C. Lower or higher temperatures can be used, but lower temperatures will produce a softer phosphor, and higher temperatures a harder one. The firing time can be varied widely, from about one hour to about 10 hours, but times greater than two hours are preferable.

What I claim is:

1. The process of preparing a calcium halophosphate phosphor which process comprises suspending calcium carbonate in water, adding an equal mole amount of phosphoric acid to precipitate secondary calcium phosphate, stirring for several minutes, then adding additional calcium carbonate, calcium fluoride and activator compounds to bring the Ca/P ratio to between about 4.70/3.00 and 4.95/3.0, filtering and firing the resultant mixture to form activated calcium phosphate.

2. The process of preparing a calcium halophosphate phosphor which process comprises suspending calcium carbonate in water, adding an equal mole amount of phosphoric acid to precipitate secondary calcium phosphate, stirring for several minutes, then adding additional calcium carbonate and calcium fluoride to bring the Ca/P ratio to between about 4.70/3.00 and 4.95/3.0, manganese carbonate and antimony oxide, filtering, and firing the resultant mixture to form a calcium phosphate phosphor.

3. The process of preparing a calcium halophosphate phosphor which comprises suspending calcium carbonate in water, adding an equal mole amount of phosphoric acid to precipitate secondary calcium phosphate, stirring for several minutes, then adding a calcium compound selected from the group consisting of the oxides and the compounds reducible to the oxides on heating to bring the Ca/P ratio to between about 4.70/3.00 and 4.95/3.0, adding also activating compounds selected from the group consisting of the oxides of antimony the oxides of manganese and compounds reducible to said oxides on heating, then filtering and firing the resultant mixture to form activated calcium phosphate.

4. The process of preparing a calcium halophosphate phosphor which process comprises suspending calcium carbonate in water, adding an equal mole amount of phosphoric acid to precipitate secondary calcium phosphate, stirring for several minutes, then adding additional calcium carbonate, calcium fluoride and activator compounds to bring the Ca/P ratio to between about 4.70/3.00 and 4.95/3.0, filtering, drying, then adding ammonium chloride and firing the resultant mixture to form activated calcium phosphate.

5. The process of preparing a calcium halophosphate phosphor which process comprises suspending calcium carbonate in water, adding an equal mole amount of phosphoric acid to precipitate secondary calcium phosphate, stirring for several minutes, then adding additional calcium carbonate and calcium fluoride to bring the Ca/P ratio to between about 4.70/3.00 and 4.95/3.0, manganese carbonate and antimony oxide, filtering, drying, then adding ammonium chloride and firing the resultant mixture to form a calcium phosphate phosphor.

6. The process of preparing a calcium halophosphate phosphor which comprises suspending calcium carbonate in water, adding an equal mole amount of phosphoric acid to precipitate secondary calcium phosphate, stirring for several minutes, then adding a calcium compound selected from the group consisting of the oxides and the compounds reducible to the oxides on heating to bring the Ca/P ratio to between about 4.70/3.00 and 4.95/3.0, adding also activating compounds selected from the group consisting of the oxides of antimony the oxides of manganese and compounds reducible to said oxides on heating, then filtering, drying, adding ammonium chloride and firing the resultant mixture to form activated calcium phosphate.

7. The process of preparing a calcium halophosphate phosphor which process comprises suspending calcium carbonate in water, adding an equal mole amount of phosphoric acid to precipitate secondary calcium phosphate, then adding additional calcium carbonate and calcium fluoride to bring the Ca/P ratio to between about 4.70/3.00 and 4.95/3.0, and antimony oxide, filtering, and firing the resultant mixture to form a calcium phosphate phosphor.

References Cited in the file of this patent

UNITED STATES PATENTS

| | | |
|---|---|---|
| 2,476,654 | Froelich | July 19, 1949 |
| 2,544,663 | Fortney | Mar. 13, 1951 |

OTHER REFERENCES

Jenkins: J. Electro Chem. Soc., July 1949, vol. 96, No. 1, p. 3.

Leverenz: Luminescence of Solids, 1950, pub. by John Wiley, page 70.